United States Patent [19]

Mattson et al.

[11] Patent Number: 5,771,627
[45] Date of Patent: Jun. 30, 1998

[54] CRAB POT WITH POSITIVE TRIGGER MECHANISM

[76] Inventors: Leonard W. R. Mattson, 1600 Alternate Hwy. 101, Warrenton, Oreg. 97146; Elmer James Mattson, Rte. 1, Box 777, Astoria, Oreg. 97103

[21] Appl. No.: 735,761

[22] Filed: Oct. 23, 1996

[51] Int. Cl.$^6$ ..................................................... A01K 69/00
[52] U.S. Cl. .............................................................. 43/100
[58] Field of Search ............................. 43/100, 102, 103, 43/104, 105

[56] References Cited

U.S. PATENT DOCUMENTS

| | | | |
|---|---|---|---|
| 2,119,828 | 6/1938 | Nordenstam | 43/100 |
| 2,530,449 | 11/1950 | Bush | 43/102 |
| 3,678,612 | 7/1972 | Hendrickson | 43/100 |
| 3,786,593 | 1/1974 | Gerbrandt | 43/100 |
| 3,795,073 | 3/1974 | Olsen | 43/100 |
| 4,819,369 | 4/1989 | Bodker | 43/103 |
| 4,905,405 | 3/1990 | Hendricks | 43/100 |
| 5,168,653 | 12/1992 | Wyman | 43/102 |
| 5,478,273 | 12/1995 | Ives | 43/100 |

FOREIGN PATENT DOCUMENTS

| | | | |
|---|---|---|---|
| 1 018654 | 1/1953 | France | 43/103 |
| 41136 | 8/1916 | Sweden | 43/100 |
| 5262 | of 1888 | United Kingdom | 43/100 |
| 2209262 | 5/1989 | United Kingdom | 43/705 |

*Primary Examiner*—Kurt Rowan
*Attorney, Agent, or Firm*—Olson & Olson

[57] ABSTRACT

A crab pot provided with a plurality of entrance tunnels each having a rectangular opening frame, utilizes the top rod of the opening frame to pivotally support a plurality of wire trigger fingers which extend vertically downward for abutment against the bottom rod of the opening frame. Pairs of such trigger fingers are formed of a single length of wire coiled intermediate its ends about the top rod of the opening frame to form a pair of pivots for the fingers, the intermediate length of wire between the coils forming legs extending downward from the coils and joined together by a span of the wire. The trigger fingers are urged gravitationally toward the position closing the rectangular tunnel opening. A limit rod projects from the top rod of the opening frame to intercept the span of wire and limit opening movement of the trigger fingers to less than 180°.

4 Claims, 3 Drawing Sheets

200
CRAB POT WITH POSITIVE TRIGGER MECHANISM

BACKGROUND OF THE INVENTION

This invention relates to crab pots, and more particularly to a crab pot having a positive acting trigger.

It is characteristic of crab pots in general that ordinary conditions of usage results in the trigger being held closed against the entrance of crabs, and also of being held open sufficiently to allow crabs to exit the pot. For example, a crab pot may become so filled with crabs that one of them can become positioned in a manner to maintain the trigger in open condition, allowing crabs within the pot to escape. In addition, one or more crabs within the pot may become positioned to prevent opening of the trigger, denying entrance of crabs into the pot. A crab pot of this type is disclosed in U.S. Pat. No. 2,530,449.

The foregoing conditions are identified as prior art in U.S. Pat. No. 5,478,273 in which the problem conditions are solved by providing a hood over the counterweight of the trigger to prevent crabs from resting upon the counterweight and preventing the trigger from opening, and by providing a protective stirrup at the bottom end of each finger of the trigger to prevent crabs from engaging and holding the trigger open.

SUMMARY OF THE INVENTION

The crab pot of this invention utilizes at each tunnel opening a trigger formed of at least one elongated wire finger which is mounted pivotally on a support rod extending across, the top of the tunnel opening, the bottom end of the trigger finger abutting a stop member extending across the bottom of the tunnel opening. Pairs of trigger fingers are secured together in spaced apart relation by a spacer member which extends downward from the top support rod to urge the fingers in the direction closing the tunnel opening. A limit member at the top of the tunnel opening is arranged for abutment by the spacer member to limit pivotal movement of the trigger fingers to less than 180°.

It is the principal objective of this invention to provide a crab pot with a trigger mechanism that cannot be held open or closed by crabs within the crab pot.

Another objective of this invention is to provide a crab pot with a trigger mechanism of the class described in which pairs of wire trigger fingers and associated spacer member are formed from a single length of wire.

Still another objective of this invention is the provision of a crab pot with the trigger mechanism of the class described in which pairs of wire trigger fingers and associated spacer member are formed from a single length of wire which is coiled about the top support rod and forms the pivot for the fingers.

A further objective of this invention is to provide a crab pot with a trigger mechanism of the class described in which pairs of wire trigger fingers and associated spacer member are formed from a single length of wire which is coiled about the top support rod, with the spacer member projecting from the top support rod toward the free ends of the fingers, to assist the fingers to move gravitationally in the direction closing the tunnel opening.

A still further objective of this invention is to provide a crab pot with the trigger mechanism of the class described in which the tunnel opening is defined by a wire frame and the trigger fingers and spacer member are mounted pivotally on the top portion of the frame.

A still further objective of this invention is to provide a crab pot with a trigger mechanism of the class described in which the limit member is mounted on the top support rod and arranged to intercept the spacer member and limit pivotal movement of the trigger fingers to less than 180°.

A further objective of this invention is to provide a crab pot with the trigger mechanism of the class described which is of simplified construction for economical manufacture, maintenance and reliable performance.

The foregoing and other objects and advantages of this invention will appear from the following detailed description, taken in connection with the accompanying drawings of a preferred embodiment.

DESCRIPTION OF THE PREFERRED EMBODIMENT

Figure 1:
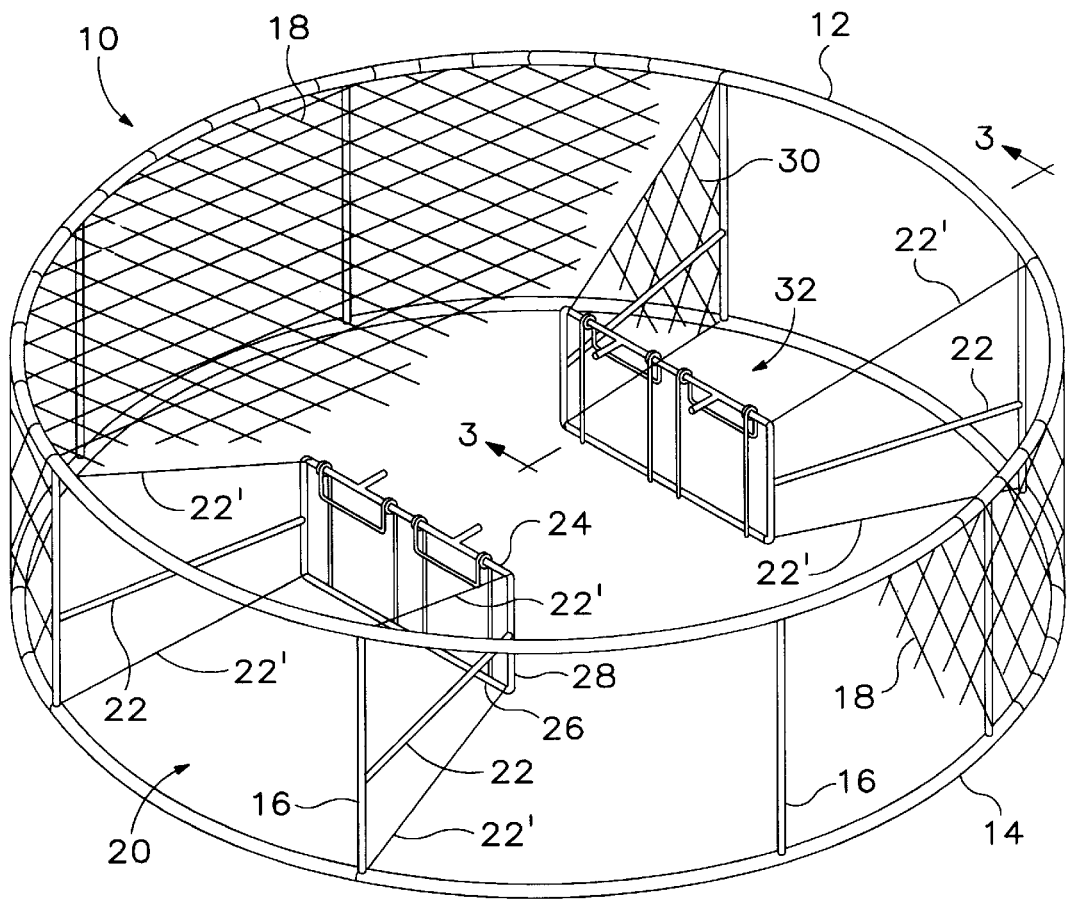
FIG. 1 is a perspective view of a crab pot incorporating a trigger mechanism embodying the features of this invention, portions of the external netting being broken away for clarity.

Referring primarily to FIG. 1 of the drawings, there is illustrated a crab pot 10 formed of top ring 12 and bottom ring 14 spaced apart vertically by circumferentially spaced rods 16. A wire or other suitable form of netting 18 extends over the top, bottom and outer circumference to form an enclosed pot.

In the embodiment illustrated, there are two entrance tunnels 20 each formed by side rods 22 and wires 22' extending inwardly of the outer periphery and terminating at their inner ends in a tunnel opening frame formed of top rod 24, bottom rod 26 and side rods 28. The sides, top and bottom of the tunnels are closed with netting 30.

In accordance with this invention, trigger mechanism 32 includes at least one elongated trigger finger extending vertically across the tunnel frame opening to divide the latter into laterally spaced openings which are smaller than, crabs to be caught in the crab pot. Each trigger finger is mounted for movement between a position closing the opening to prevent the escape of crabs from within the pot, and a position retracted from the opening to allow crabs to enter through the opening into the pot.

Figure 2:
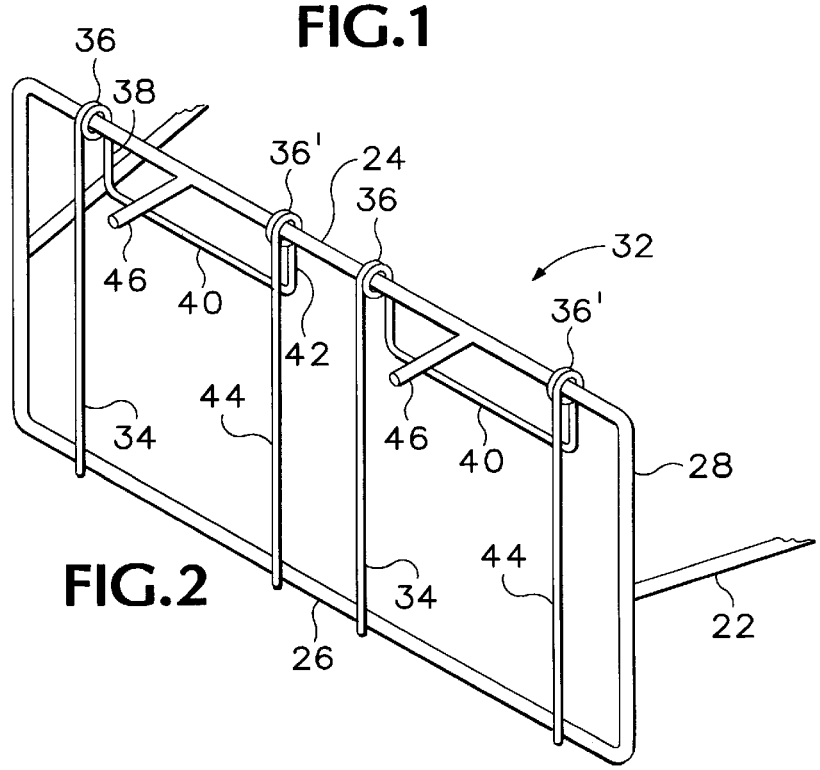
FIG. 2 is a perspective view of one of the trigger finger mechanisms mounted on a tunnel opening frame.

In the preferred embodiment illustrated, and best shown in FIG. 2, pairs of trigger fingers are formed from a single length of wire rod and mounted upon the top rod 24 of the tunnel opening frame for pivotal movement relative to the opening. Thus, trigger finger 34 extends upwardly from abutment at its lower end against the bottom rod 26 of the frame and then is bent to form a coil 36 which freely encircles the top rod 24. The wire then is bent downward, substantially parallel to the finger 34, forming a leg 38, and then the wire is extended laterally, parallel to rod 24, to form a spacer member 40. The wire then is bent upward to form a second leg 42. At the upper end of the leg 42 the wire is bent to form a second coil 36' about the top rod 24, and then the wire is bent downward to form a second trigger finger 44 which terminates at its lower end for abutment with the bottom rod 26 of the tunnel opening frame.

Figure 3:
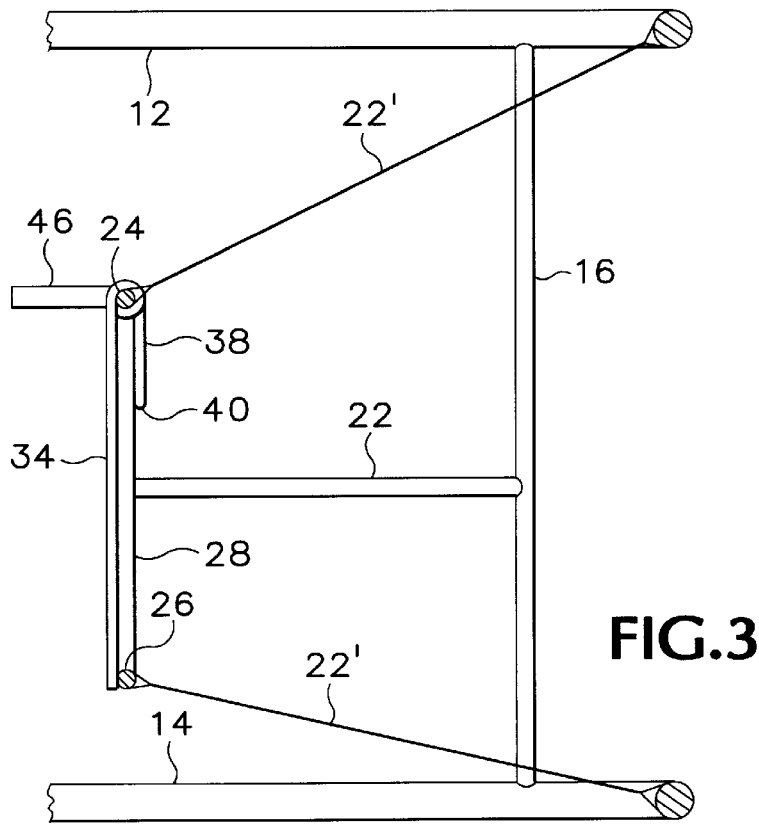
FIG. 3 is a sectional view taken on the line 3—3 in FIG. 1, showing the trigger mechanism closing the tunnel opening.
Figure 4:
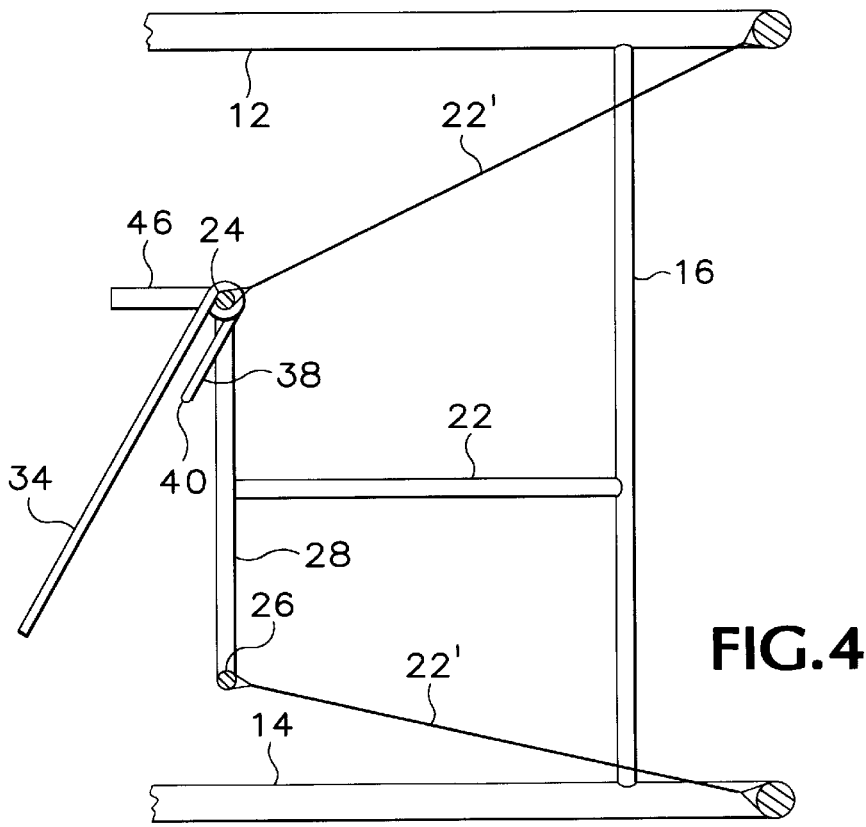
FIG. 4 is a sectional view similar to FIG. 3, showing the trigger mechanism retracted from the tunnel opening.

The spacer member 40 serves to space the pivot coils 36 and 36' apart, and may also serve to assist gravity return of the trigger fingers 34 and 44 to the position of FIG. 3, closing the tunnel opening. As illustrated in FIGS. 1 and 2, each tunnel frame is provided with two pairs of finger and. spacer member assemblies.

In accordance with this invention, means is provided to limit the rotation of the trigger finger and spacer assembly to less than 180° between the open and closed positions previously described. In the preferred embodiment illustrated, a limit rod 46 is associated with each spacer member 40 and projects from the top rod 24 of the tunnel opening frame to intercept the spacer member when the trigger fingers and spacer have rotated about 90° from the closed position of FIG. 3 to fully open position. By limiting the rotation to less than 180°, the trigger fingers respond to gravity to be urged toward the closed position of FIG. 3.

Figure 5:
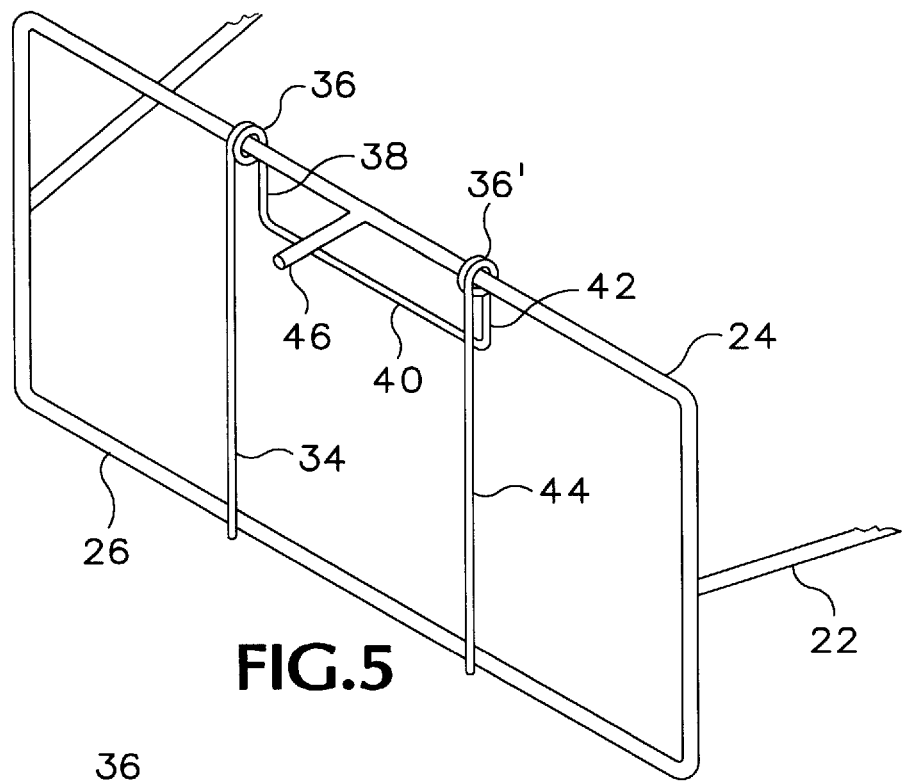
FIG. 5 is a perspective view, similar to FIG. 2, showing a single trigger finger pair and spacer unit associated with a tunnel ring.

In the embodiment of FIGS. 1–4 there are two limit rods. 46, one associated with each of the two spacer member 40. FIG. 5 illustrates an arrangement of a single unit of a pair of trigger fingers 34, 44 interconnected by a spacer member 40 and mounted on the top rod 24 to divide the tunnel opening in three substantially equal spaces. A single limit rod 46 on the top rod 24 functions to intercept the spacer member 40 to limit opening movement of the trigger fingers, as in the previous embodiment.

Figure 6:
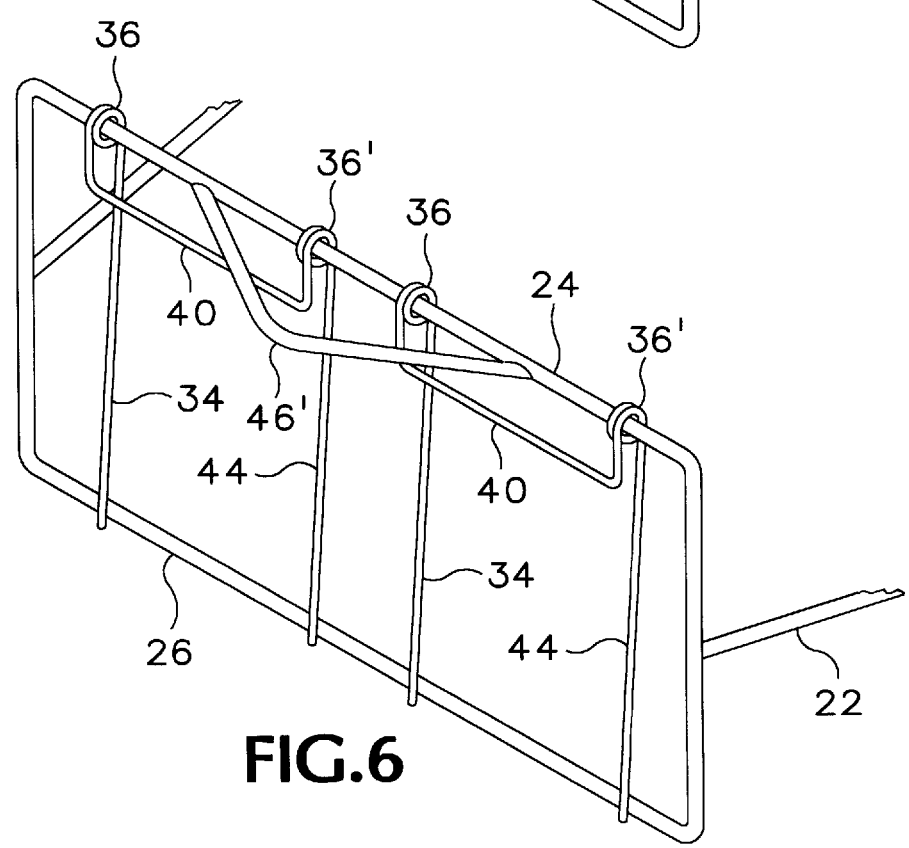
FIG. 6 is a perspective view, similar to FIG. 2, showing a single V-shaped limit rod arrangement.

FIG. 6 illustrates an arrangement of two units of trigger, fingers and spacers, as in the embodiment of FIGS. 1–4. The two limit rods of FIGS. 1–4 are replaced by a single rod 46' of V shape. The ends of the rod are secured to the top rod 24 between the spaced coils 36, 36' of each unit, and the apex of the V-shaped rod projects horizontally inward from the tunnel frame, in the same manner as the limit rods 46 of FIGS. 1–4.

In order to dispose the spacer members 40 of the two units of FIG. 6 for abutment with the V-shaped limit rod 46' the coils 36, 36' are wound about the top rod 24 in the reverse direction of FIGS. 1–4 and 5. The trigger fingers 34, 44 thus extend downward from the outer side of the top rod 24 and terminate at their lower ends on the inner side of the bottom rod 26.

It is to be noted that in all positions of rotation of the trigger fingers and spacer, no crab within the pot can acquire a position that prevents the fingers from moving to retracted position allowing crabs to enter the pot. Moreover, since the trigger fingers terminate at their lower ends closely adjacent the bottom rod 26, no crab within the pot can acquire a position that prevents the fingers from moving to the closed position, to prevent the escape of crabs from, within the pot.

It will be apparent to those skilled in the art that various changes may be made in the size, shape, type, number and arrangement of parts described hereinbefore. For example, the trigger fingers may be spaced apart by means other than the spacer member 40 and by means other than a single length of wire. The limit rod 46 may be replaced by limit mechanism, arranged to engage one of the trigger fingers or one of the coils. The pivotal mounting of the trigger finger and spacer assembly may be provided by a rod which is independent of the top rod 24 of the tunnel opening frame. As a further alternative, the legs 38 and 42 and interconnecting spacer rod, 40 may be arranged to project outwardly of the top rod 24 and, terminate closely adjacent the underside of the top netting 30 of the tunnel when the trigger fingers 34, 44 close the tunnel ring opening. In this arrangement the limit rods 46 extend downward from the top rod 24 to engage the spacer rods 40 to limit rotation of the trigger fingers to less than 180°. The tunnel ring may be of oval or other desired shape, and a single trigger finger may suffice for effectively closing tunnel rings of suitable size. These and other modifications and changes may be made without departing from the spirit of this invention and the scope of the appended claims.

We claim:

1. In combination with a crab pot having at least one entrance tunnel having an inner end and an opening at the inner end of the tunnel by which crabs enter the pot, the opening being defined by top and bottom vertically spaced, horizontally extending frame members, a trigger mechanism for removably closing said tunnel opening, comprising:

a) at least one elongated trigger finger mounted pivotally on the top frame member of said tunnel opening and extending downward therefrom for movement between a position abutting the bottom frame member and closing said opening against escape of crabs from within the pot and a position retracted from said opening allowing crabs to enter the pot, and b) a limit rod mounted on the opening frame of the crab pot in position to and limit pivotal movement of said trigger finger to less than 180°.

2. The combination of claim 1 including a plurality of trigger fingers and a spacer member attached to and extending between adjacent spaced fingers.

3. In combination with a crab pot having at least one entrance tunnel having an inner end and an opening at the inner end of the tunnel by which crabs enter the pot, the opening being defined by a frame having a top frame member, a trigger mechanism for removably closing said tunnel opening, comprising:

a) a plurality of elongated trigger fingers mounted pivotally adjacent the top of said tunnel opening and extending downward therefrom for movement between a position closing said opening against escape of crabs from within the pot and a position retracted from said opening allowing crabs to enter the pot, b) a spacer member attached to and extending between adjacent spaced fingers, and c) a limit rod secured to and projecting from the top frame member for engagement by the spacer member to limit pivotal movement of the trigger fingers and spacer member to less than 180°.

4. In combination with a crab pot including a frame defining at least one entrance tunnel having an inner end and an opening at the inner end of the tunnel by which crabs enter the pot, and having a laterally extending top frame member and a bottom frame member, a trigger mechanism for removably closing said tunnel opening, comprising a plurality of trigger fingers mounted pivotally on the top frame member and dimensioned to abut the top of the bottom frame member in the position of the trigger fingers closing said tunnel opening, a spacer member attached to and extending between adjacent spaced trigger fingers, the trigger fingers and spacer member being formed of a single length of material with the spacer member extending between adjacent trigger fingers and joined thereto through coils mounting the trigger fingers and spacer member on said top frame member for pivotal movement between said closing and retracted positions, and a limit rod member secured to and projecting from the top frame member for engagement by the spacer member to limit pivotal movement of the trigger fingers to less than 180°.

* * * * *

UNITED STATES PATENT AND TRADEMARK OFFICE
CERTIFICATE OF CORRECTION

PATENT NO. : 5,771,627
DATED : 30 June 1998
INVENTOR(S) : LEONARD W.R. MATTSON & ELMER J. MATTSON It is certified that error appears in the above-identified patent and that said Letters Patent is hereby corrected as shown below:

Column 4, line 21, "to and limit" should read:

--to limit--.

Signed and Sealed this

First Day of September, 1998

Attest:

BRUCE LEHMAN

Attesting Officer

Commissioner of Patents and Trademarks